(12) United States Patent
Ando et al.

(10) Patent No.: US 7,098,453 B2
(45) Date of Patent: Aug. 29, 2006

(54) SCANNING PROBE MICROSCOPY SYSTEM AND METHOD OF MEASUREMENT BY THE SAME

(75) Inventors: Kazunori Ando, Chiba (JP); Amiko Nihei, Chiba (JP)

(73) Assignee: SII NanoTechnology Inc., (JP)

( * ) Notice: Subject to any disclaimer, the term of this patent is extended or adjusted under 35 U.S.C. 154(b) by 9 days.

(21) Appl. No.: 11/054,504

(22) Filed: Feb. 9, 2005

(65) Prior Publication Data
US 2005/0189490 A1   Sep. 1, 2005

(30) Foreign Application Priority Data
Feb. 27, 2004   (JP)   ............................. 2004-053725

(51) Int. Cl.
*H01J 37/28*   (2006.01)

(52) U.S. Cl. .......................... 250/306; 250/307; 73/105
(58) Field of Classification Search ................ 250/306, 250/307; 73/105
See application file for complete search history.

(56) References Cited

U.S. PATENT DOCUMENTS
6,389,886 B1 *   5/2002   Daniels et al. ................ 73/105

* cited by examiner

*Primary Examiner*—Kiet T. Nguyen
(74) *Attorney, Agent, or Firm*—Adams & Wilks

(57) ABSTRACT

A scanning probe microscopy system has a cantilever having a probe at a distal end thereof and a heating unit for heating the sample. A moving unit effects relative movement between the cantilever probe and the sample to bring the cantilever probe into contact with a surface of the sample for measuring a property of the sample. A shielding unit shields between the cantilever probe and the sample during heating of the sample by the heating unit.

20 Claims, 4 Drawing Sheets

SCANNING PROBE MICROSCOPY SYSTEM AND METHOD OF MEASUREMENT BY THE SAME

BACKGROUND OF THE INVENTION

Field of the Invention

The present invention relates to a scanning probe microscopy system and, more specifically, to a scanning probe microscopy system that performs measurement by heating a sample, and to a method of measurement by the scanning probe microscopy system.

A scanning probe microscopy system in the related art includes a cantilever having a probe at the distal end thereof, a unit for detecting displacement of the cantilever, a unit for heating a sample, and a unit for moving the sample, and heating of the sample is performed in a state in which the cantilever exists above the sample (For example, see JP-A-2000-241332).

In the scanning probe microscopy system in the related art, contamination on the sample surface or evaporable component contained in the sample evaporated when the sample is heated may attach to the probe of the cantilever. When the attached substance is accumulated on the probe, the thickness of the distal end of the probe is increased, whereby the shape of the sample surface may not be measured with high resolution.

The attached substance on the probe may cause an adverse effect when measuring the mutual action between the sample surface and the probe. For example, when measurement of the adsorption characteristics or friction characteristics of the sample surface is intended, the measured result would be characteristics determined by the mutual action between the attached substance and the sample surface. The attached substance on the probe has been a cause to impair measurement of primary physical property of the sample surface.

The attached substance on the cantilever may cause warping of the cantilever, which may impair measurement of the sample. The reason why the cantilever is warped by the attached substance is that there is a difference of heat-expansion coefficient between the cantilever and the attached substance. When the cantilever warps, the direction of reflected laser beam irradiated on and reflected from the cantilever may deviate. When the direction of the reflected laser beam is deviated, it may be excluded from the range of the reflected laser beam which the displacement detecting unit can detect. When the reflected laser beam is excluded from the detectable range of the displacement of the displacement detecting unit, the displacement of the cantilever cannot be detected. Since the displacement of the cantilever cannot be detected, the sample cannot be measured. Therefore, the attached substance on the cantilever has been a factor which impairs measurement of the sample itself.

In another related art, a method of measurement in which the sample is preheated at a position apart from the position of probe measurement, and then the sample is moved by a sample transfer system for probe measurement is proposed (for example, see JP-A-7-244056).

However, with the method disclosed in JP-A-7-244056, the sample is transferred after having heated once, the temperature of the sample is lowered. Since the temperature of the sample is lowered, it is necessary to heat the sample again to a desired temperature in the probe measurement chamber. Therefore, the sample is subject to heat several times, and in particular, when the sample is high-molecular material, the physical properties are changed to those after having been subjected to a thermal cycle, and hence it is forced to measure the physical properties of the sample after thermal history. In other words, measurement of the physical properties of the sample without causing thermal history of each heated temperature cannot be performed.

In another related art, a method of removing the attached substance by rubbing the probe on an attached substance removing mechanism when the substance is attached on the probe is proposed (for example, see JP-A-2001-21476). However, since a binding power of attachment between the evaporable components evaporated during heating of the sample and the probe is significantly strong in many cases, the attached substance may not be removed completely. If the probe is excessively pressed against the attached substance removing mechanism to remove the attached substance completely, the probe may become damaged and thickened, and high-resolution measurement cannot be performed by the thickened needle.

SUMMARY OF THE INVENTION

It is an object of the invention to solve the above-described problems and provide a scanning probe microscopy system which can measure and maintain the shape of a sample surface and physical properties of the sample with high resolution even when an evaporable component is evaporated from the heated substance during heating of the sample, and which can measure the change of the physical properties at each heated temperature without causing thermal history on the sample.

In order to solve the above described problems, a scanning probe microscopy system of the invention includes a cantilever having a probe at the distal end thereof, a heating unit for heating the sample, a sample moving unit for moving the sample, and a shielding unit for shielding between the cantilever and the sample.

According to the scanning probe microscopy system of the invention, the shielding unit includes a slidable sliding mechanism.

According to the scanning probe microscopy system of the invention, the shielding unit includes a rotatable rotating mechanism.

According to the scanning probe microscopy system of the invention, the shielding unit includes a shielding portion on the sample side.

The present invention also provides a method of measurement by a scanning probe microscopy system including a cantilever having a probe at the distal end thereof, a heating unit for heating the sample, a sample moving unit for moving the sample, and a shielding unit for shielding between the cantilever and the sample, including the steps of heating the sample in a state in which the shielding unit is interposed between the cantilever and the sample, and measuring the sample in a state in which the shielding unit is not interposed between the cantilever and the sample.

In a scanning probe microscopy system according to the invention, a cantilever having a probe at the distal end thereof, a heating unit for heating the sample, a sample moving unit for moving the sample, and a shielding unit for shielding between the cantilever and the sample are provided. Accordingly, the shielding unit can be interposed between the sample and the probe during preheating of the sample, and hence the contamination on the sample surface or the evaporable components within the sample is allowed to be attached on the shielding unit. Therefore, attachment of the evaporated components on the probe is prevented, and hence the surface shape of the sample can be measured with high resolution.

Since the slidable sliding mechanism is provided on the shielding unit, preheating can be performed in a state in which the distance between the probe and the sample surface is reduced, and then, after having preheated the sample, the shielding unit can be retracted from the sample and the probe while maintaining the temperature of the sample, so that the probe can be moved toward the sample surface in a short time to measure the shape of the sample surface.

Since the rotatable rotating mechanism is provided, after having preheated the sample, the shielding unit can be retracted from the sample and the probe by a rotary motion in a short time to measure the shape of the sample surface.

Since the shielding unit does not perform the shielding movement and retracting movement between the sample and the cantilever, but the shielding portion is fixed to the sample side so that the shielding portion does not move relative to the sample, the shielding portion is heated to the same temperature as the sample, and hence even when the evaporated components from the sample surface is attached to the shielding portion, it evaporates again. Therefore, accumulation of attached subject on the shielding portion can be alleviated.

Since the method of measurement of the sample with the scanning prove microscopy according to the present invention includes the steps of heating the sample in a state in which the shielding unit is interposed between the cantilever and the sample, and measuring the sample in a state in which the shielding unit is not interposed between the cantilever and the sample. Therefore, the shape of the sample surface can be measured in a state in which the temperature of the sample is maintained and no thermal history is caused thereon.

Since attachment of the substance on the probe is prevented, the change of the mutual action between the probe and the sample surface is eliminated, and hence the primary physical properties of the sample surface can be advantageously measured.

Since attachment of the substance on the cantilever is prevented, the cantilever is prevented from warping, and hence the shape and the physical property of the sample surface can be measured continuously after having heated the sample.

BRIEF DESCRIPTION OF THE DRAWINGS

FIG. 3 is a pattern diagram showing the scanning probe microscopy system according to a third embodiment of the invention, in which

DETAILED DESCRIPTION OF THE PREFERRED EMBODIMENTS

Figure 1:
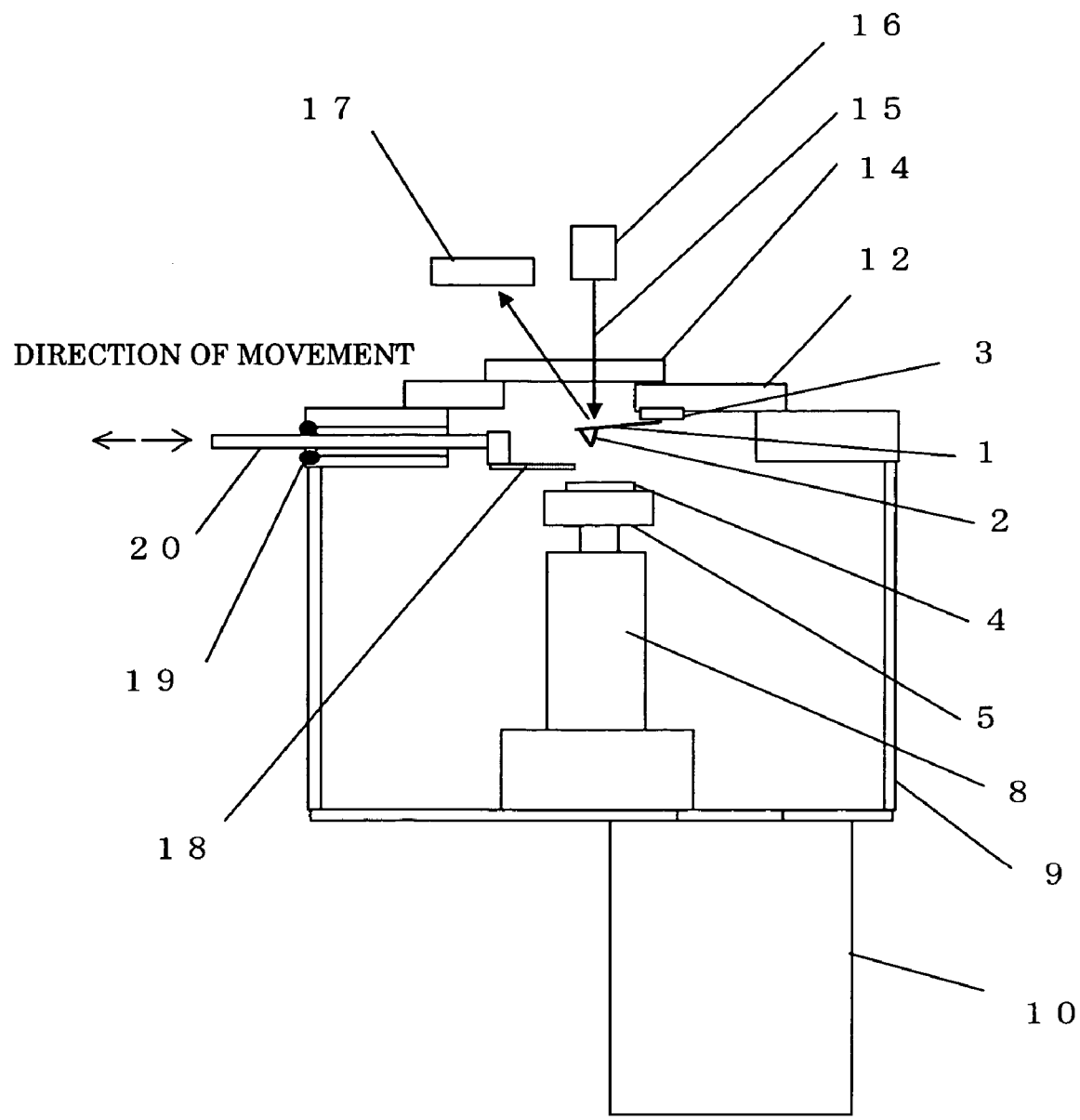
FIG. 1 is a pattern diagram showing a scanning probe microscopy system according to a first embodiment of the invention.

Referring now to the drawings, embodiments of the invention will be described in detail.

First Embodiment

FIG. 1 is a pattern diagram showing a scanning probe microscopy system according to the first embodiment of the invention.

The cantilever 1 is formed of silicon or silicon nitride as a material, and is about 200 μm in length, about 40 μm in width, and about 3 μm in thickness in shape. A minute probe 2 is provided at the distal end of the cantilever 1, the minute probe being formed by etching, being about 3–7 μm in height, about 10 nm in diameter at the distal end and being mounted to a cantilever base 3. The cantilever base 3 is fixed to the cantilever mounting member 12. The cantilever mounting member 12 is shaped like, for example, a flange formed of stainless steel, and is installed on top of a vacuum container 9 in such a manner that air-tightness is ensured by an O-ring or the like and defines a vacuum space therein. The cantilever mounting member 12 includes a transparent glass window 14, and vacuum-tightness is ensured with respect to the window 14 by an O-ring.

A laser source 16 for irradiating a laser 15 is located on the atmosphere side outside the vacuum container 9. The laser 15 irradiated from the laser source 16 on the atmosphere side is irradiated to the cantilever 1 installed on the vacuum side in the vacuum container 9 via the window 14. Reflected light of the laser 15 from the cantilever 1 reaches a displacement detecting unit 17 which is located also on the atmosphere side. The displacement of the cantilever 1 is measured by detecting the reached position of the reflected right by the displacement detecting means 17.

The sample 4 is placed on a heating unit 5. The heating unit 5 includes a heater integrated therein so as to be capable of heating the sample 4 to a desired temperature. For example, in the case of a sample of inorganic material, such as silicon, aluminum, or alumina, when the surface of the sample 4 is contaminated, the contamination component on the surface is evaporated when heated, and may be attached to the distal end of the probe 2 of about 10 nm in radius at the distal end thereof, whereby increasing the thickness of the distal end of the probe 2. In the case of a high-molecular sample such as polyethylene, polystyrene, or polycarbonate, the component which constitutes the sample may have uneven distribution of the molecular mass from part to part. The component portion having relatively low molecular mass out of the high-molecular sample is apt to evaporate when heated. Therefore, the evaporated components may attach to the distal end of the probe 2, whereby the thickness of the distal end may be increased.

The heating unit 5 is installed on the sample moving or transfer unit 8, and is capable of changing measuring position of the sample 4. The heating unit 5 and the sample transfer unit 8 are installed within the vacuum container 9. The sample transfer unit 8 is composed, for example, of a piezoelectric device or the like, and hence is capable of transferring when voltage is applied. The direction of movement depends on the direction of polarity of voltage, and the amount of movement depends on the magnitude of voltage. A vacuum pump 10 is connected to the vacuum container 9, 50 that the interior of the vacuum container 9 is vacuumed.

A shielding member in form of a shielding plate 18 is attached to the distal end of the moving mechanism. The moving mechanism is a sliding mechanism 20 capable of sliding movement while keeping the vacuum container 9 in a vacuum-tight state by the airtight seal 19. The shielding plate 18 and the sliding mechanism 20 constitute the shielding unit. For example, an O-ring is used as the airtight seal 19. When the sliding mechanism 20 is moved to the direction indicated as the direction of movement by an arrow in FIG. 1, the shielding plate 18 also moves, so that the shielding plate 18 can be interposed between and retracted from between the probe 2 of the cantilever 1 and the sample 4. By forming the shielding plate 18 in a size larger than the size of the sample 4, the evaporated component from the sample surface is prevented from attaching to the probe 2. When heating the sample as the subject to be heated, there exists an evaporated component from the heating unit in addition to the sample surface. Therefore, it is necessary to consider prevention of evaporation both from the sample as the subject to be heated and the heating unit. Therefore, by forming the shielding plate 18 to a size larger than the heating unit 5, the evaporated component from the heating unit is prevented from attaching to the probe 2, which is further effective. The shielding plate 18 is preferably formed of metal which is free from electrostatic so that the attached component does not come off. The shielding plate 18 may not be a flat plate, but may be a cylindrical shape to cover and hide the cantilever 1. By exposing the rear end of the sliding mechanism 20 opposite from the sliding plate 18 on the side of the atmosphere with the intermediary of the airtight seal 19, a power source, not shown, for driving the sliding mechanism 20 can be disposed on the side of the atmosphere, so that deterioration of measurement environment due to discharge of gas from the power source is prevented. Besides the O-ring seal, the airtight seal 19 may be a bellows seal or a seat of magnetic fluid.

Subsequently, the action of the scanning probe microscopy system according to the first embodiment will be described.

First, the sliding mechanism 20 is moved toward the right as indicated by the arrow in FIG. 1 and the shielding plate 18 is interposed between the probe 2 and the sample 4. Subsequently, the sample 4 is heated by the heating unit 5.

When the sample 4 is heated, the contamination component on the sample surface, or the evaporable component in the sample evaporates and is attached to the lower surface of the shielding plate 18 opposing to the sample. Therefore, attachment of the evaporated component on the probe 2 can be prevented. After having preheated (degasification and cleaning of the surface by heating) the sample 4 sufficiently, the sliding mechanism 20 is moved toward the left as indicated by an leftward arrow to retract the shielding plate 18 from between the probe 2 and the sample 4. Subsequently, the sample transferring unit 8 is moved upward to bring the probe 2 into contact with the surface of the sample 4, so that measurement can be started.

Second Embodiment

Subsequently, referring to FIG. 2, the second embodiment of the present invention will be described. The common components to the first embodiment shown in FIG. 1 are represented by the same reference numerals and detailed description thereof will be omitted.

Figure 2:
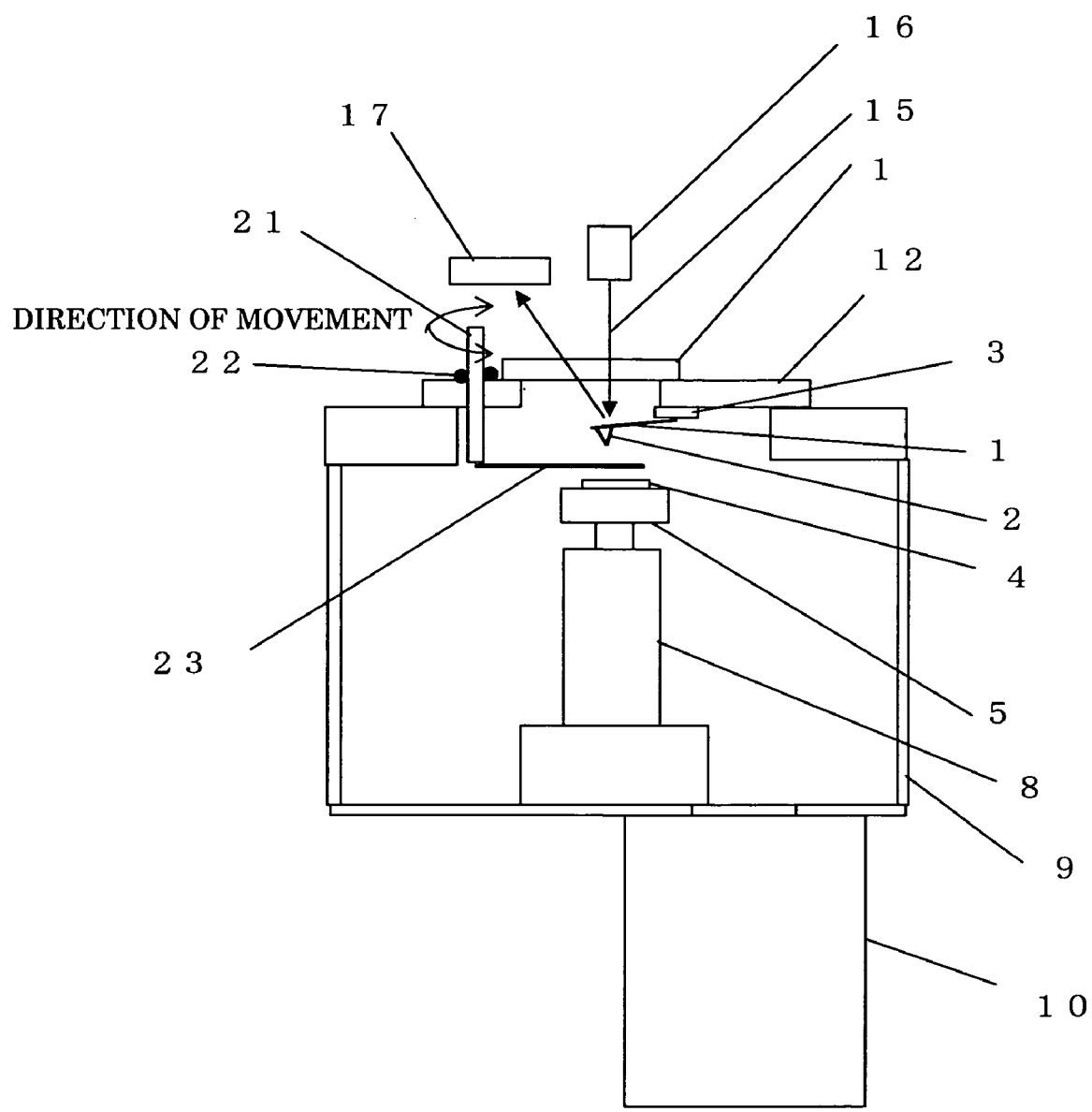
FIG. 2 is a pattern diagram showing the scanning probe microscopy system according to a second embodiment of the invention.

FIG. 2 is a pattern diagram showing the scanning probe microscopy system according to the second embodiment of the present invention. A rotating mechanism 21 as a moving mechanism is built, for example, in the cantilever mounting member 12 in a state in which the vacuum-tightness is secured by the airtight seal 22. A shielding plate 23 is mounted to the distal end of the rotating mechanism 21. When the rotating mechanism 21 is rotated, the shielding plate 23 can be interposed between and retracted from between the probe 2 and the sample 4 in a short time. It is also possible to orient a revolving shaft of the rotating mechanism horizontally, mount the arcuate-shaped shielding plate onto the revolving shaft, interpose the shielding plate between the probe 2 and the sample 4, and rotate and retract with respect to the revolving shaft. The method of preventing attachment of the substance on the probe 2 is as described above. The airtight seal 22 may be an O-ring seal or a seal of magnetic fluid.

Third Embodiment

Referring now to FIG. 3, a third embodiment of the invention will be described. The common components to the first embodiment and the second embodiments shown in FIG. 1 and FIG. 2 are represented by the same reference numerals and detailed description thereof will be omitted.

Figure 3A:
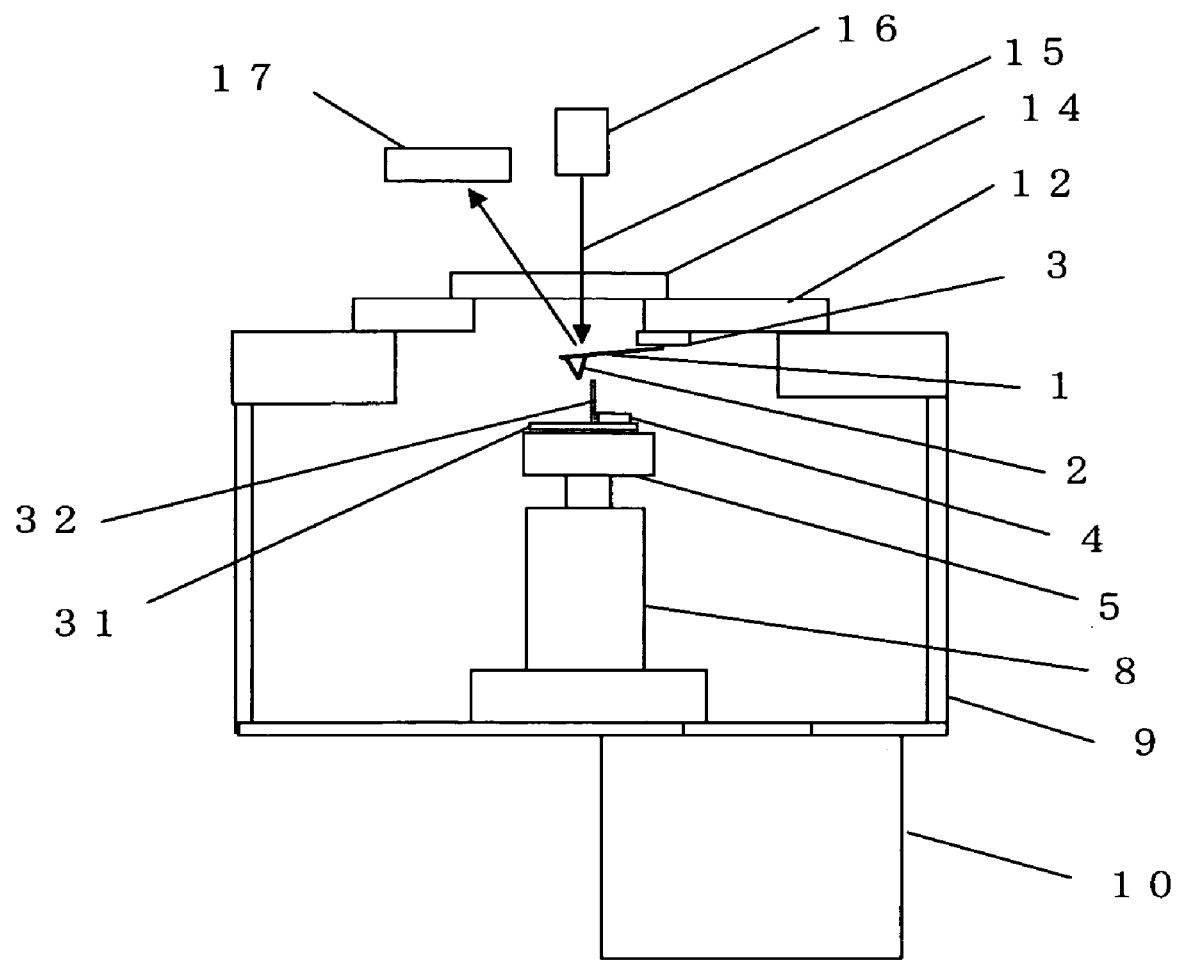
FIG. 3A shows a state in which a sample is heated.
Figure 3B:
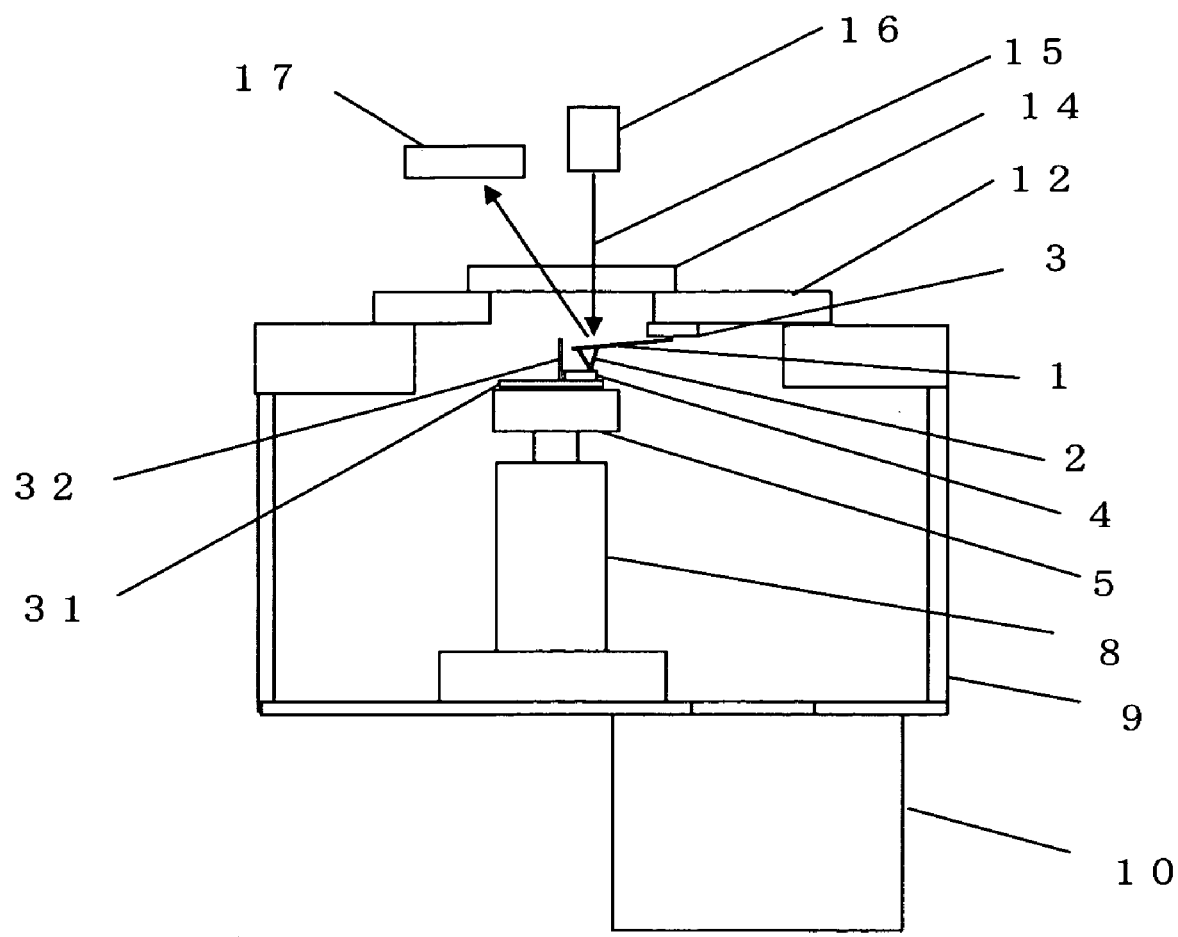
FIG. 3B shows a state in which the sample is measured.

FIG. 3 is a pattern diagram showing the scanning probe microscopy system according to the third embodiment of the invention, in which FIG. 3A is a state in which the sample is heated, and FIG. 3B is a state in which the sample is measured. A shielding member or portion 32 is configured at about the center on a deposition preventing plate 31 so as to divide the deposition preventing plate 31 into two parts. The sample 4 is placed on one of the surfaces of the deposition preventing plate 31 isolated by the shielding portion 32.

Subsequently, the operation of the third embodiment will be described. As shown in FIG. 3A, the deposition preventing plate 31 is moved rightward by the sample transferring unit 8 so that the deposition preventing plate 31 comes right below the probe 2, so that the sample 4 and the probe 2 are shielded by the shielding portion 32. In this state, the sample 4 is heated to allow the contamination on the sample surface or the evaporable component within the sample to evaporate and be attached to the right side surface of the shielding portion 32. By employing inorganic material which is washed on the surface thereof, such as Si, as the deposition preventing substrate 31, attachment of the evaporated substance on the probe 2 during heating is prevented, thereby preventing attachment of the evaporated component on the probe 2.

Then, after having preheated (degasification and cleaning of the surface by heating) the sample 4 sufficiently, as shown in FIG. 3B, the deposition preventing plate 31 is moved leftward by the sample transferring unit 8 so that the sample 4 comes to right below the probe 2, and the probe 2 is brought into contact with the surface of the sample 4, so that measurement can be started.

As described thus far, the sample having contamination on the surface of evaporable components therein, for example, general high-molecular samples such as polystyrene has distribution of the molecular mass in its component. Therefore, the low molecular component is evaporated while the sample is preheated. However, by preventing the evaporated component from attaching on the probe by the shielding unit and performing heat degasification or surface cleaning sufficiently before starting measurement, attachment of the evaporated component onto the probe is prevented, and hence the shape or the physical property of the sample surface can be measured with high resolution.

Although it is also conceivable to preheat the sample with a separate apparatus, there is a problem that many types of high-molecule samples such as polyethylene-terephthalate (PET), or polycarbonate (PC) may be increasingly crystallized and changed in shape or physical properties of the surface, such as viscoelasticity or adsorptivity, due to the thermal history when heated. There is another problem that the physical properties may be changed by absorbing moisture in air when taken out from the separate apparatus. In order to cope with these problems, according to the invention as described above, reliability of measurement result may be increased by preventing attachment of the evaporated component on the probe when heating the sample at a desired temperature, and feeding the sample continuously for measurement of the shape or the physical properties of the sample surface while keeping the temperature unchanged without exposing in the air moisture, which is further effective.

What is claimed is:

1. A scanning probe microscopy system comprising:
   a cantilever having a probe at a distal end thereof;
   a heating unit for heating a sample;
   a sample moving unit for moving the sample; and
   a shielding unit for shielding between the cantilever and the sample.

2. A scanning probe microscopy system according to claim 1; wherein the shielding unit comprises a sliding mechanism.

3. A scanning probe microscopy system according to claim 1; wherein the shielding unit comprises a rotating mechanism.

4. A scanning probe microscopy system according to claim 1; wherein the scanning probe microscopy system has a cantilever side on which the cantilever is disposed and a sample side on which the sample is disposed; and wherein the shielding unit comprises a shielding portion disposed on the sample side.

5. A scanning probe microscopy system according to claim 1; wherein the shielding unit comprises a shielding member and a sliding mechanism for sliding the shielding member between a first position in which the shielding member is interposed between the cantilever and the sample and a second position in which the shielding member is not interposed between the cantilever and the sample.

6. A scanning probe microscopy system according to claim 5; wherein the sample moving unit comprises means for moving the sample toward the cantilever so that the probe is brought into contact with a surface of the sample; and wherein the shielding member is larger than the surface of the sample so as to cover the surface of the sample in a state in which the shielding member is in the first position and the probe does not contact the surface of the sample.

7. A scanning probe microscopy system according to claim 1; wherein the shielding unit comprises a shielding member and a rotating mechanism for rotating the shielding member between a first position in which the shielding member is interposed between the cantilever and the sample and a second position in which the shielding member is not interposed between the cantilever and the sample.

8. A scanning probe microscopy system according to claim 7; wherein the sample moving unit comprises means for moving the sample toward the cantilever so that the probe is brought into contact with a surface of the sample; and wherein the shielding member is larger than the surface of the sample so as to cover the surface of the sample in a state in which the shielding member is in the first position and the probe does not contact the surface of the sample.

9. A scanning probe microscopy system according to claim 1; wherein the shielding unit comprises a plate disposed on the heating unit and a shielding portion disposed on a surface of the plate to divide the surface of the plate into a first surface portion for supporting the sample and a second surface portion isolated by the shielding portion from the first surface portion.

10. A scanning probe microscopy system according to claim 9; wherein the shielding portion is mounted at an approximate center of the surface of the plate.

11. A method of measuring a property of a sample using a scanning probe microscopy system, comprising the step of:
   providing a scanning probe microscopy system comprised of a cantilever having a probe at a distal end thereof, a heating unit for heating a sample, and a shielding member for shielding between the cantilever and the sample;
   heating the sample using the heating unit in a state in which the shielding member shields the cantilever from the sample; and
   measuring a property of the sample by contacting the probe with a surface of the sample in a state in which the shielding member does not shield the cantilever from the sample.

12. A scanning probe microscopy system for measuring a property of a sample, the scanning probe microscopy system comprising:
   a cantilever having a probe at a distal end thereof;
   a moving unit for effecting relative movement between a sample and the cantilever to bring the probe into contact with a surface of the sample for measurement of a property of the sample;
   a heating unit for heating the sample;
   a shielding member for shielding between the cantilever and the sample; and
   a moving mechanism for moving the shielding member to a first position in which the shielding member is interposed between the cantilever and the sample during heating of the sample by the heating unit and to a second position in which the shielding member is not interposed between the cantilever and the sample during measurement of a property of the sample.

13. A scanning probe microscopy system according to claim 12; wherein the moving mechanism comprises a sliding mechanism for sliding the shielding member between the first and second positions.

14. A scanning probe microscopy system according to claim 12; wherein the moving unit comprises means for moving the sample toward the cantilever so that the probe is brought into contact with a surface of the sample; and wherein the shielding member is larger than the surface of the sample so as to cover the surface of the sample in a state in which the shielding member is in the first position and the probe does not contact the surface of the sample.

15. A scanning probe microscopy system according to claim 12; wherein the moving mechanism comprises a rotating mechanism for rotating the shielding member between the first and second positions.

16. A scanning probe microscopy system according to claim 12; wherein the moving unit comprises means for moving the sample toward the cantilever so that the probe is brought into contact with a surface of the sample; and wherein the shielding member is larger than the surface of the sample so as to cover the surface of the sample in a state in which the shielding member is in the first position and the probe does not contact the surface of the sample.

17. A scanning probe microscopy system for measuring a property of a sample, the scanning probe microscopy system comprising:
  a cantilever having a probe at a distal end thereof for contacting a surface of a sample for measuring a property of the sample;
  a heating unit for heating the sample;
  a shielding member for shielding between the probe of the cantilever and the sample; and
  a moving unit for effecting relative movement between the sample and the cantilever so that during heating of the sample by the heating unit the sample is disposed at a first position relative to the probe in which the shielding member shields the probe from the sample, and so that during measurement of a property of the sample the sample is disposed at a second position relative to the probe in which the shielding member does not shield the probe from the sample.

18. A scanning probe microscopy system according to claim 17; further comprising a plate mounted on the heating unit; and wherein the shielding member is disposed on a surface of the plate to divide the surface of the plate into a first surface portion for supporting the sample and a second surface portion isolated by the shielding member from the first surface portion.

19. A method of measuring a property of a sample, comprising the steps of:
  providing a cantilever having a probe disposed over a surface of a sample;
  disposing a shielding member at a position between the probe and the sample;
  heating the sample while the shielding member is disposed between the probe and the sample so that a contamination component evaporated from the sample resulting from heating the sample is attached to a surface of the shielding member and is prevented from attaching to the probe;
  removing the shielding member from the position between the probe and the sample;
  effecting relative movement between the cantilever and the sample to bring the probe into contact with the sample surface for measuring a property of the sample.

20. A method according to claim 19; wherein the heating step comprises the step of heating the sample while the probe is disposed over the surface of the sample with the shielding member disposed therebetween.

* * * * *